(12) United States Patent
Mizobata et al.

(10) Patent No.: US 9,981,587 B2
(45) Date of Patent: *May 29, 2018

(54) VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Shuuhei Miyake, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/155,365

(22) Filed: May 16, 2016

(65) Prior Publication Data
US 2016/0339817 A1 Nov. 24, 2016

(30) Foreign Application Priority Data
May 19, 2015 (JP) ................................. 2015-101835

(51) Int. Cl.
A47C 7/02 (2006.01)

(52) U.S. Cl.
CPC .......... *B60N 2/80* (2018.02); *B60N 2002/899* (2018.02)

(58) Field of Classification Search
CPC ........ B60N 2/48; B60N 2/68; B60N 2205/40; B60N 2/4805; B60N 2002/4888; B60N 2/482; B60N 2/4826
USPC .. 297/452.15, 452.41, 391, 404, 410, 284.1, 297/284.2, 284.6, 216.12
See application file for complete search history.

(56) References Cited

U.S. PATENT DOCUMENTS

| | | | |
|---|---|---|---|
| 8,833,859 B2 * | 9/2014 | Matsushima | B60N 2/4817 297/391 |
| 9,452,697 B2 * | 9/2016 | Okubo | B60N 2/48 |
| 9,511,695 B2 * | 12/2016 | Okubo | B60N 2/4808 |
| 9,746,048 B2 * | 8/2017 | Okubo | F16F 7/108 |
| 2012/0098316 A1 | 4/2012 | Matsushima et al. | |
| 2012/0112510 A1 * | 5/2012 | Ishimoto | B60N 2/4228 297/408 |

(Continued)

FOREIGN PATENT DOCUMENTS

| | | |
|---|---|---|
| CN | 103826917 A | 5/2014 |
| CN | 104507747 A | 4/2015 |

(Continued)

OTHER PUBLICATIONS

U.S. Appl. No. 15/155,402 to Hiroshi Mizobata et al., which was filed May 16, 2016.

(Continued)

*Primary Examiner* — Chi Q Nguyen
(74) *Attorney, Agent, or Firm* — Greenblum & Bernstein, P.L.C.

(57) ABSTRACT

A vehicle seat includes a skeleton member, panel members that are attached to the skeleton member and has a space inside, and a dynamic damper that is provided with a weight and an elastic body and arranged inside the space. The weight is fixed by being fitted into a fitting part, the fitting part being provided in the elastic body and formed so as to encircle and be able to be fitted to a part of an outer periphery part of the weight. A part other than the fitting part in the elastic body is fixed to the panel members.

3 Claims, 11 Drawing Sheets

(56) References Cited

U.S. PATENT DOCUMENTS

| | | | |
|---|---|---|---|
| 2015/0159721 A1* | 6/2015 | Okubo | B60N 2/48 297/404 |
| 2015/0183343 A1* | 7/2015 | Okubo | B60N 2/48 297/404 |
| 2016/0121770 A1* | 5/2016 | Takahashi | B60N 2/48 297/452.18 |
| 2016/0311351 A1* | 10/2016 | Mizobata | B60N 2/48 |
| 2016/0339816 A1* | 11/2016 | Mizobata | B60N 2/48 |
| 2017/0225597 A1* | 8/2017 | Okubo | B60N 2/48 |

FOREIGN PATENT DOCUMENTS

| | | |
|---|---|---|
| JP | 60-151135 | 8/1985 |
| JP | 2002-242986 A | 8/2002 |
| JP | 2003-226179 A | 8/2003 |
| JP | 2006-034326 A | 2/2006 |
| JP | 2013-010416 A | 1/2013 |
| JP | 2014-213793 A | 11/2014 |

OTHER PUBLICATIONS

U.S. Appl. No. 15/155,310 to Hiroshi Mizobata et al., which was filed May 16, 2016.
Chinese Office Action for CN App. No. 201610325802.9 dated Dec. 4, 2017, along with partial English-language translation thereof.

* cited by examiner

VEHICLE SEAT

INCORPORATION BY REFERENCE

The disclosure of Japanese Patent Application No. 2015-101835 filed on May 19, 2015 including the specification, drawings and abstract is incorporated herein by reference in its entirety.

BACKGROUND OF THE INVENTION

1. Field of the Invention

The invention relates to a vehicle seat mounted on a vehicle such as an automobile.

2. Description of Related Art

A vehicle seat is disclosed, in which vibration transmitted from a vehicle body to the vehicle seat is transmitted to a dynamic damper provided inside a headrest so as to make the dynamic damper resonate. Thus, vibration of the vehicle seat is converted into vibration of the dynamic damper, thereby restraining vibration of the vehicle seat. In a vehicle seat described in Japanese Patent Application Publication No. 60-151135 (JP 60-151135 A), a dynamic damper is arranged inside a space formed inside a headrest. To be more specific, by fixing an inner cover to stays, a space is provided inside the inner cover, and, the dynamic damper is attached to the stays through a bracket inside the space.

SUMMARY OF THE INVENTION

In the technology described in JP 60-151135 A, means such as adhesion and screw fastening is used to attach a weight, which structures the dynamic damper, to an elastic body. This requires materials and components to attach the weight to the elastic body, and productivity could be deteriorated as a process for manufacturing the dynamic damper becomes complex.

The invention provides a vehicle seat in which a dynamic damper is arranged inside an inner space of the vehicle seat. In the vehicle seat, the dynamic damper is able to be manufactured highly productively with a small number of components and materials.

A vehicle seat according to an aspect of the invention includes a skeleton member, panel members that are attached to the skeleton member and has a space inside, and a dynamic damper that is provided with a weight and an elastic body and arranged inside the space. The weight is fixed by being fitted into a fitting part, the fitting part being provided in the elastic body and formed so as to encircle and be able to be fitted to a part of an outer periphery part of the weight. A part other than the fitting part in the elastic body is fixed to the panel members.

According to the above aspect, the dynamic damper is formed as the weight is fitted into and fixed to the fitting part of the elastic body. Therefore, it is possible to manufacture the dynamic damper highly productively without a need of using materials and components such as an adhesive and a screw. Thus, it is possible to manufacture a vehicle seat in which the dynamic damper is arranged inside an inner space of the vehicle seat, highly productively with a small number of components and materials.

In the foregoing aspect, the weight may be formed into a plate-shaped form, and the fitting part may be formed so as to cover a part or all of corner parts in the outer periphery part of the weight so that the weight does not come into direct contact with the panel members when the dynamic damper vibrates greatly.

According to the above structure, the fitting part of the elastic body is formed so as to cover a part or all of corner parts in the outer periphery part of the weight so that the weight does not come into direct contact with the panel members. Therefore, it is not necessary to attach an interference preventing material or the like on an inner side of the panel members, thereby reducing the number of components.

In the foregoing aspect, the fitting part and the part other than the fitting part in the elastic body may be formed integrally with each other.

According to the above structure, since the elastic body is formed as an integrated body, it is not necessary to assemble the fitting part to the part other than the fitting part. Thus, productivity is improved even further.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIG. 1 to FIG. 8 show one embodiment of the invention. This embodiment is an example in which the invention is applied to a seat for an automobile. In each of the drawings, the arrows indicate directions of an automobile when a seat for an automobile is installed in an automobile. In the following explanation, description of directions is given based on these directions. A seat for an automobile 1 according to this embodiment is provided with a seat cushion 4 serving as a seating part, a seat back 2 serving as a backrest, and a headrest 3 supporting a head. Lower end parts of the seat back 2 on both sides are connected with a rear end part of the seat cushion 4 through a recliner 7 so that an angle is adjustable. Here, the seat for an automobile 1 is an example of a "vehicle seat" in the scope of claims.

Figure 1:
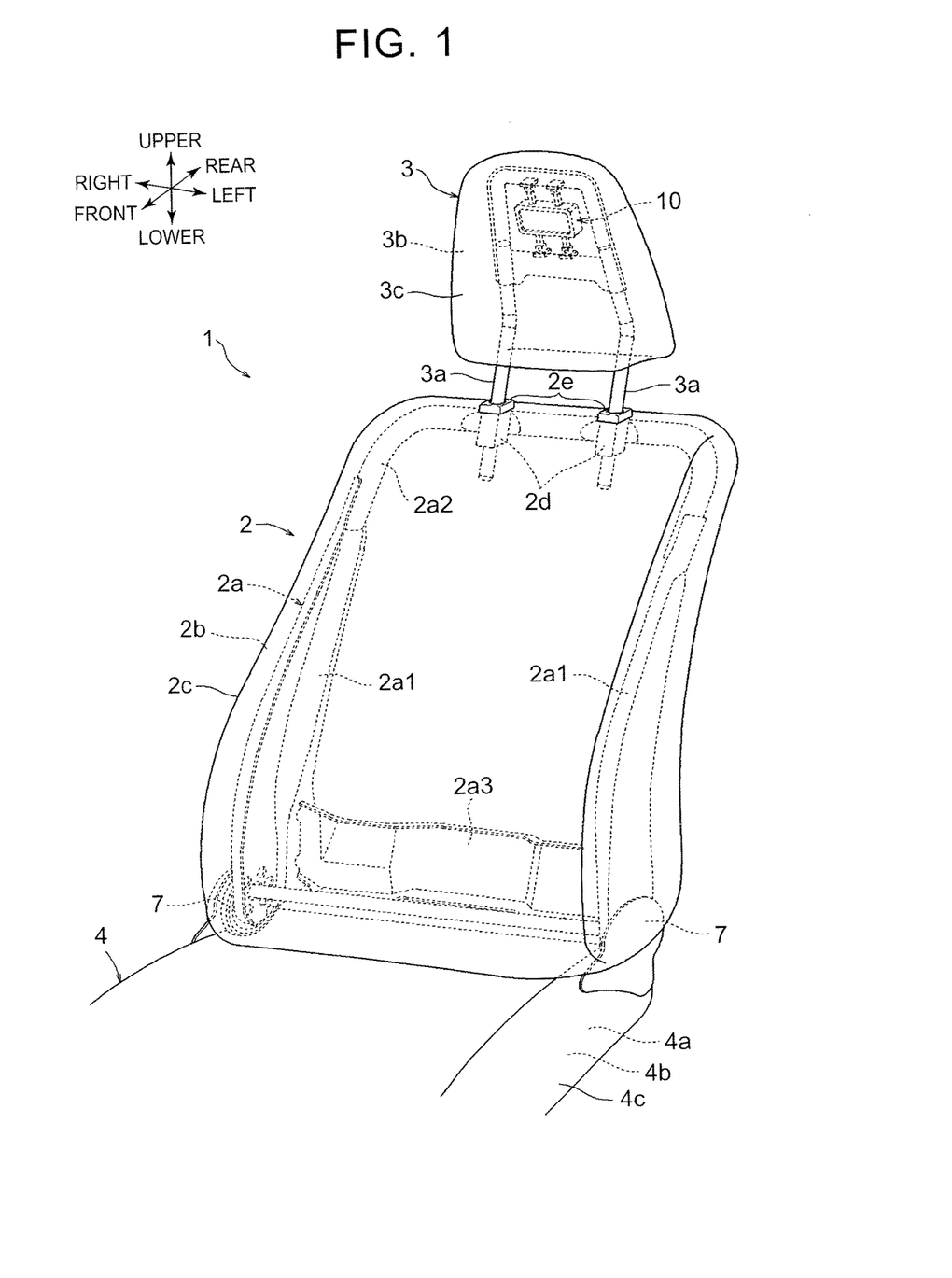
FIG. 1 is a partial perspective view of a vehicle seat according to one embodiment of the invention.
Figure 2:
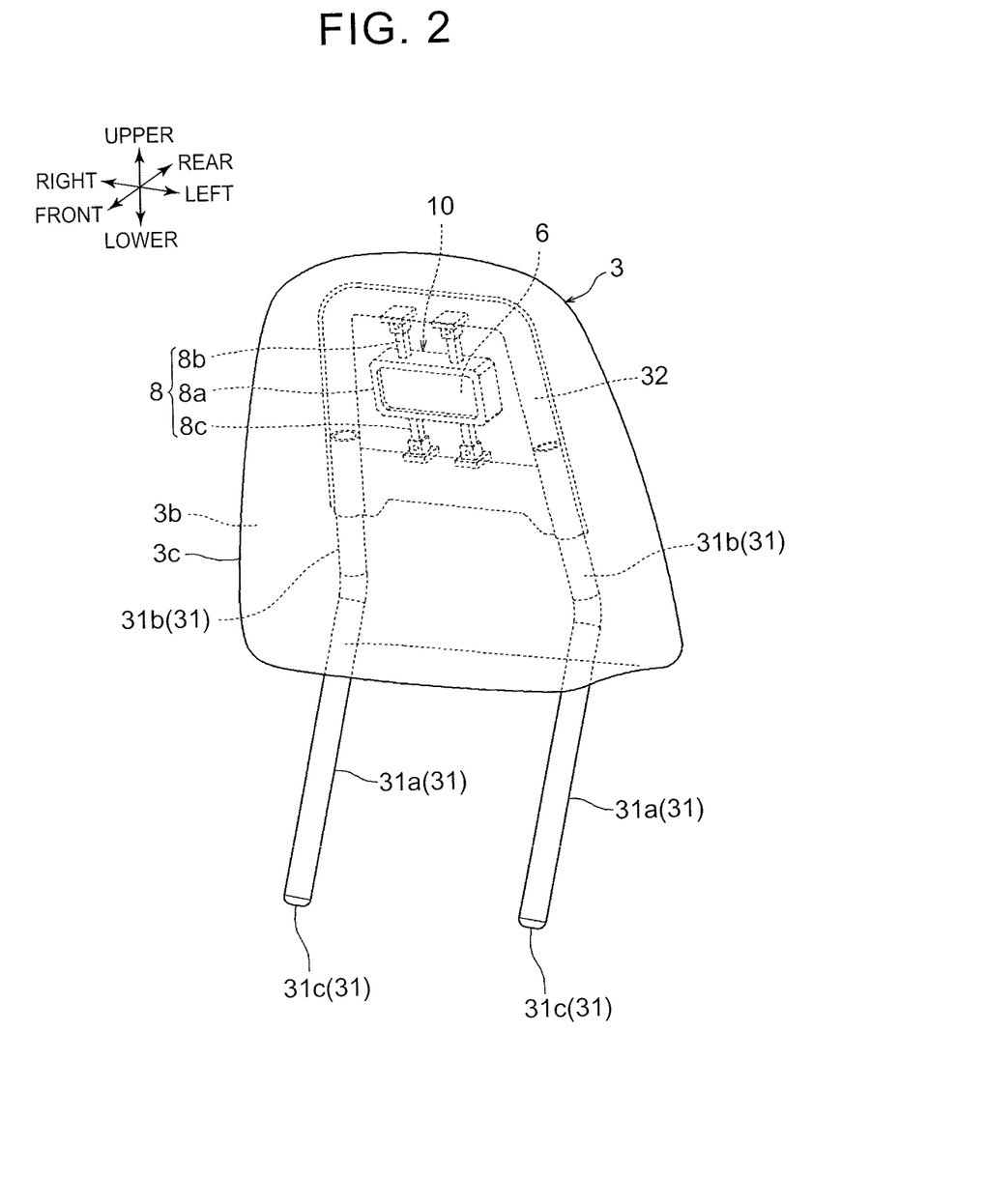
FIG. 2 is a perspective view of a headrest according to the embodiment.

As shown in FIG. 1, the seat back 2, the headrest 3, and the seat cushion 4 have frames 2a, 3a, 4a that form a skeleton, pads 2b, 3b, 4b serving as cushion materials, and skins 2c, 3c, 4c serving as skin materials, respectively. The pads 2b, 3b, 4b are placed on the frames 2a, 3a, 4a, respectively, and the pads 2b, 3b, 4b are covered with the skins 2c, 3c, 4c, respectively. The frame 2a of the seat back 2 has a pair of left and right side frames 2a1, a pipe-shaped upper frame 2a2 connecting upper parts of the side frames 2a1, and a press plate-shaped lower panel 2a3 connecting lower parts of the side frames 2a1.

Figure 3:
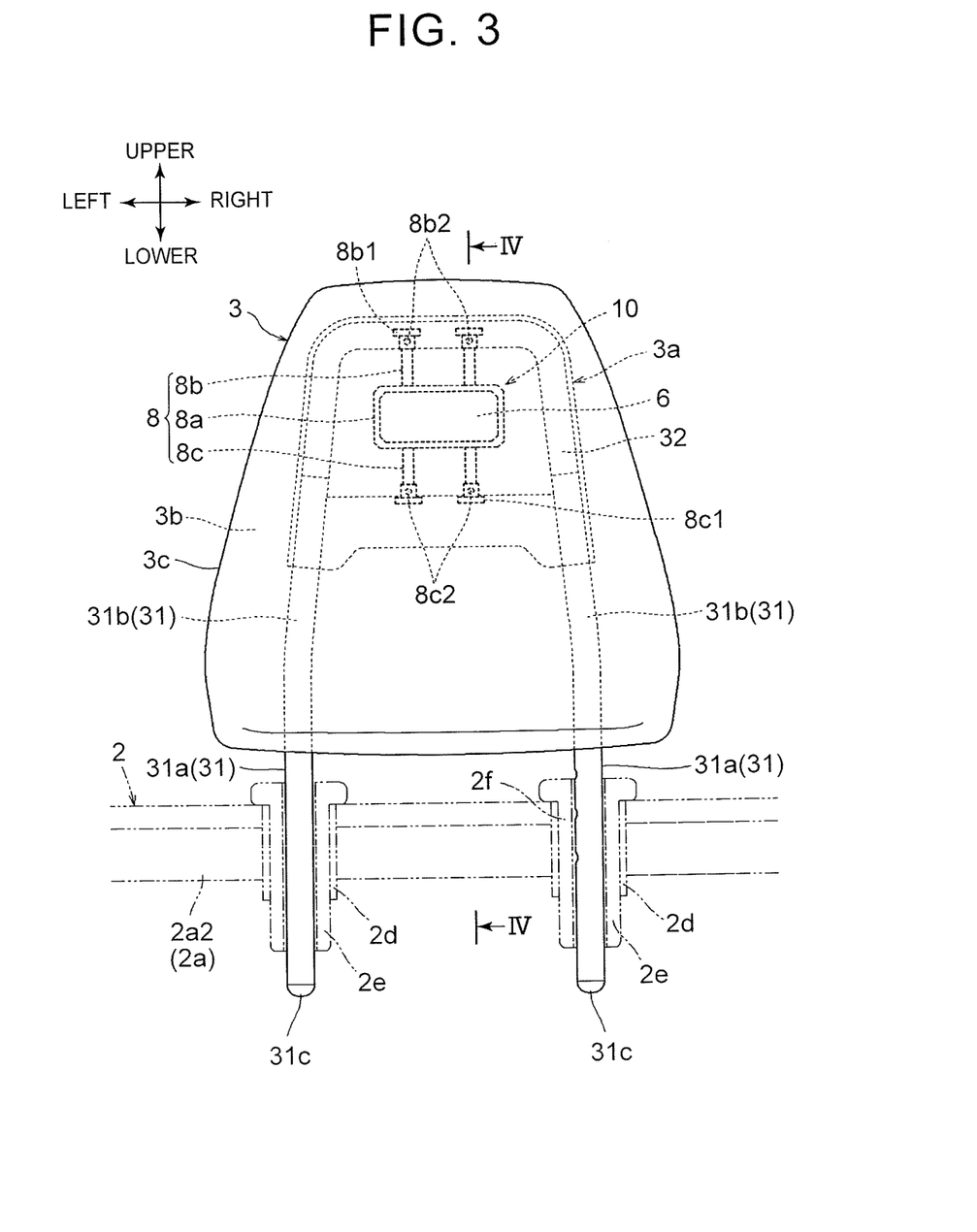
FIG. 3 is a front view of a part of a seat back and the headrest according to the embodiment.

As shown in FIG. 1 and FIG. 3, a pair of quadrangular cylindrical-shaped metallic brackets 2d are attached to the upper frame 2a2. Generally cylindrical resin support members 2e are inserted and fixed to the brackets 2d, respectively. In one of the support members 2e, a stopper 2f is provided in order to adjust height of the headrest 3 with respect to the seat back 2.

Figure 5:
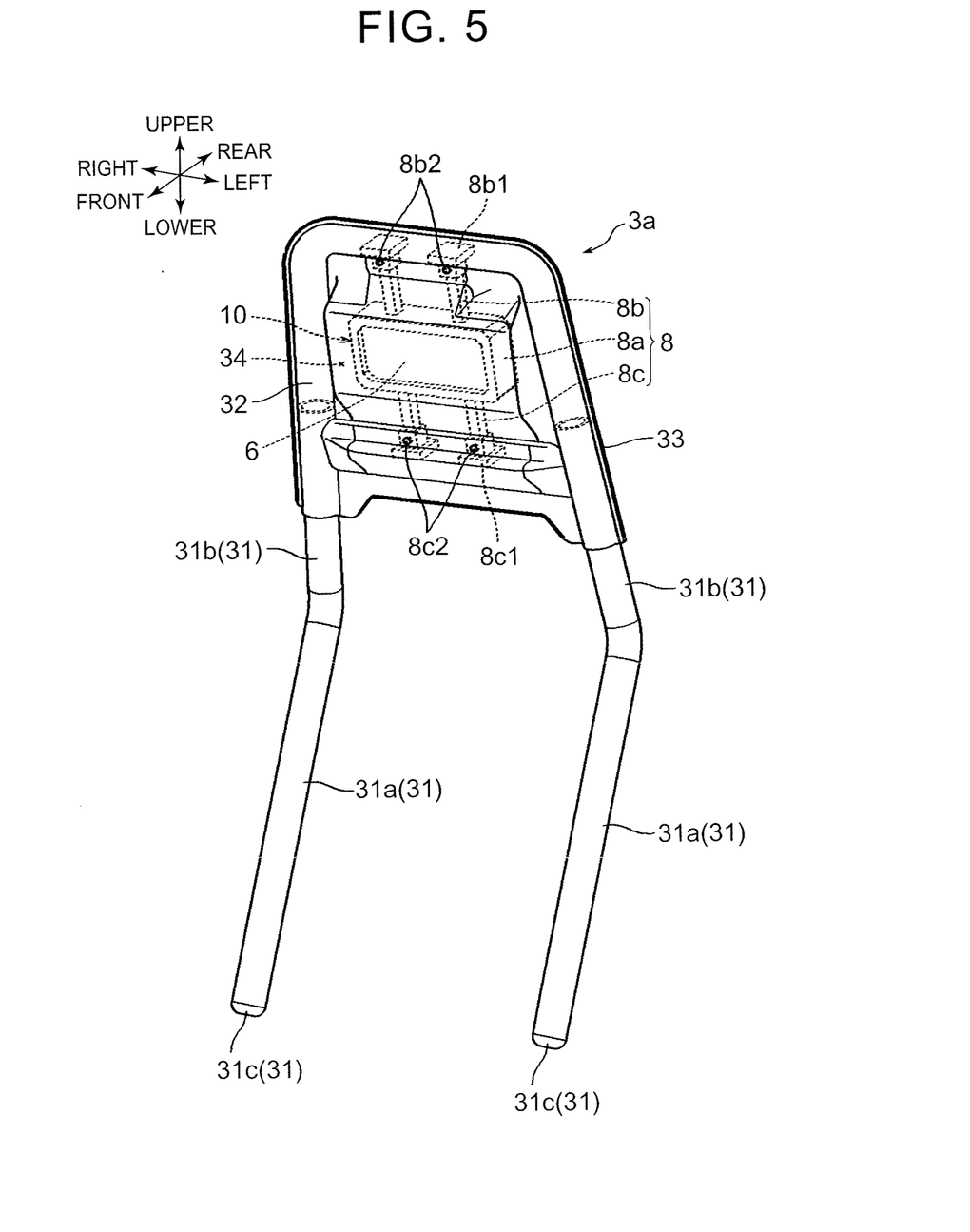
FIG. 5 is a perspective view of a state in which a dynamic damper is attached to a frame of the headrest according to the embodiment.
Figure 6:
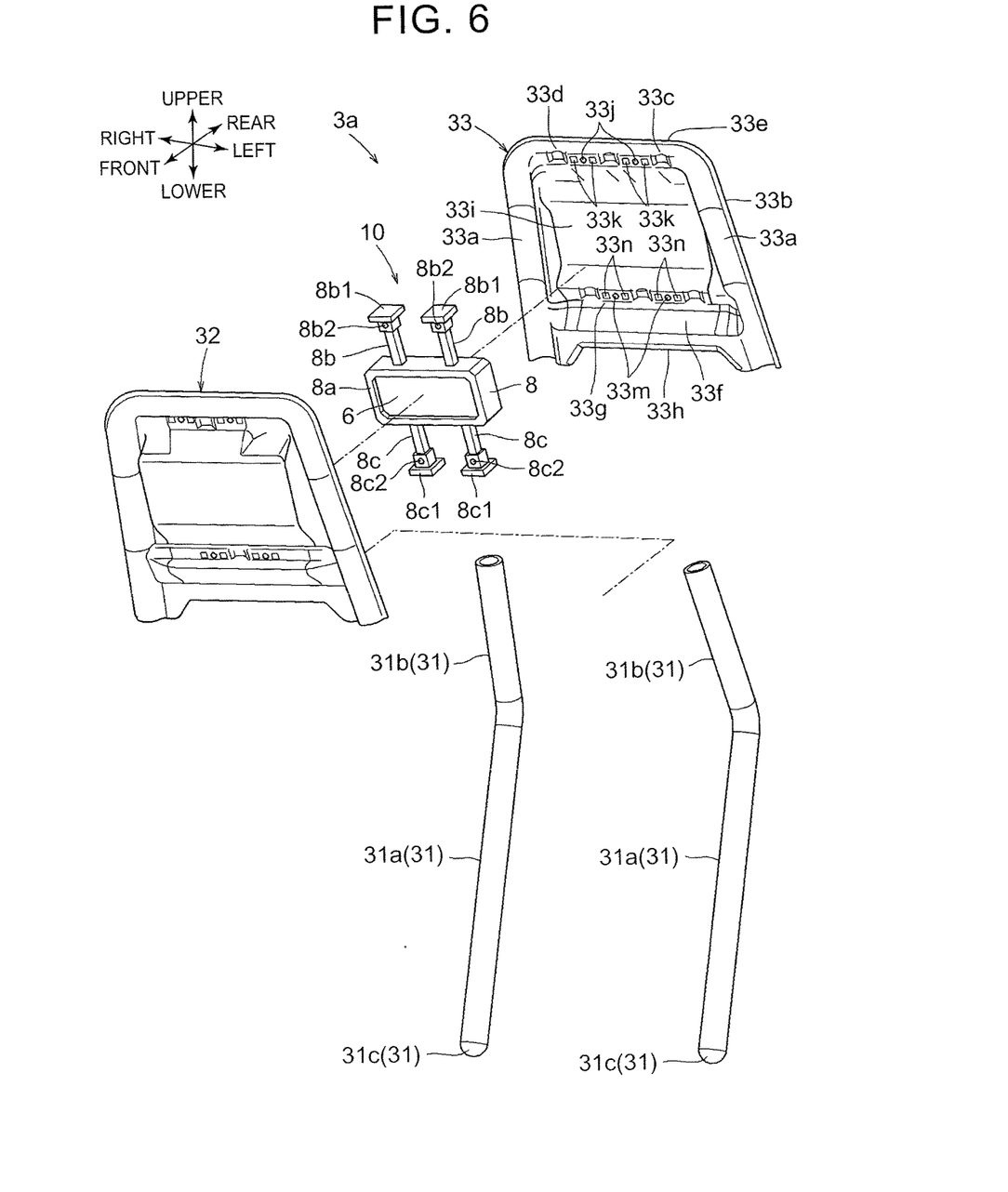
FIG. 6 is an exploded perspective view of a state where the dynamic damper is attached to the frame of the headrest according to the embodiment.

As shown in FIG. 5 and FIG. 6, the frame 3a of the headrest 3 is provided with a pair of stays 31 formed from a pipe material having a circular section, and a front panel 32 and a rear panel 33 that sandwich upper end parts of the stays 31 from front and rear and are integrated with each other. The pair of stays 31 are connected with each other by the front panel 32 and the rear panel 33, and structure the frame 3a serving as a skeleton of the headrest 3, as one integrated body.

The stay 31 has a vertical pillar part 31a extending in the upper and lower direction, and a panel mounting part 31b that extends from an upper end of the vertical pillar part 31a in the front direction and also towards the center of the headrest. A round shaped part 31c is provided in a lower end part of the vertical pillar part 31a so as to conform to regulations regarding interior projections. As shown in FIG. 3, the vertical pillar parts 31a are inserted into the support members 2e and attached to the seat back 2. In one of the stays 31, a plurality of grooves (not shown) are formed, and the stays 31 are positioned with respect to the support members 2e by the grooves and the stopper 2f. Thus, height of the headrest 3 with respect to the seat back 2 is adjusted. The stays 31 are examples of a "skeleton member" in the scope of claims, and the front panel 32 and the rear panel 33 are examples of a "panel member" in the scope of claims.

As shown in FIG. 5 and FIG. 6, the front panel 32 and the rear panel 33 are press-formed components made from a steel plate, and have the same external shape, which is a generally trapezoidal shape, seen in the front and rear direction. The front panel 32 has a half shell shaped form that expands so as to project in an approximately front direction. The rear panel 33 has a half shell shaped form that expands so as to project in an approximately rear direction. When a shell shape is formed by joining a rear end part of the front panel 32 and a front end part of the rear panel 33 to each other, a space 34 is formed between the front panel 32 and the rear panel 33, in which a later-described dynamic damper 10 is arranged. The front panel 32 and the rear panel 33 are formed into shapes that are generally symmetrical with respect to a joining surface when the front panel 32 and the rear panel 33 are joined into the shell shape. Therefore, detailed explanation is given regarding the shape of the rear panel 33 as a representative.

Figure 4:
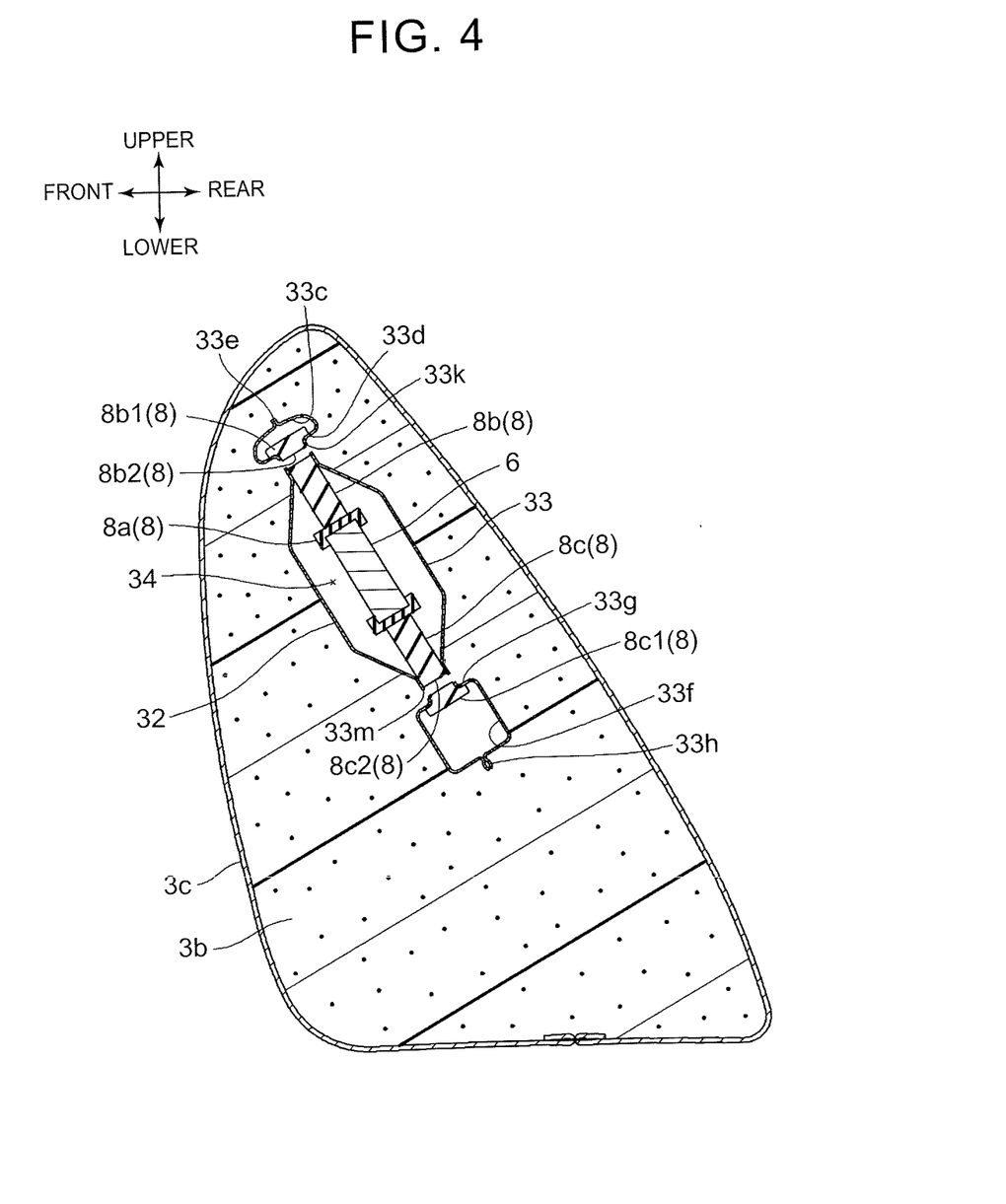
FIG. 4 is a sectional view taken along the arrow line IV-IV in FIG. 3

As shown in FIG. 6, vertical groove parts 33a are provided in left and right end parts of the rear panel 33. Each of the vertical groove parts 33a has an arc-shaped section having an inner diameter slightly larger than an outer diameter of the stay 31. When the rear panel 33 is joined to the front panel 32 into the shell shape, the vertical groove parts 33a are used to sandwich the panel mounting parts 31b of the stays 31 together with vertical groove parts of the front panel 32, and integrate the stay 31, the front panel 32, and the rear panel 33. Flange parts 33b to be joined to the front panel 32 by welding are provided in outer end parts of the vertical groove parts 33a. As shown in FIG. 4 and FIG. 6, an upper transverse groove part 33c having a generally U-shaped section is provided in an upper end part of the rear panel 33. A lower wall surface 33d of the upper transverse groove part 33c is used to engage and attach a part of the later-described dynamic damper 10 together with a lower wall surface of an upper transverse groove part of the front panel 32 when the rear panel 33 is joined to the front panel 32 into the shell shape. A flange part 33e to be joined to the front panel 32 by welding is provided in an upper end part of the upper transverse groove part 33c. The flange parts 33b and the flange part 33e are provided continuously without an interval.

A lower transverse groove part 33f having a generally U-shaped section is provided in a lower end part of the rear panel 33 between the left and right vertical groove parts 33a. An upper wall surface 33g of the lower transverse groove part 33f is used to engage and attach a part of the later-described dynamic damper 10 together with an upper wall surface of a lower transverse groove part of the front panel 32 when the rear panel 33 is joined to the front panel 32 into the shell shape. A flange part 33h to be joined to the front panel 32 by welding is provided in a lower end part of the lower transverse groove part 33f. A bulged part 33i projecting to the rear is formed in a center part of the rear panel 33 surrounded by the vertical groove parts 33a, the upper transverse groove part 33c, and the lower transverse groove part 33f. When the rear panel 33 is joined to the front panel 32 into the shell shape, the bulged part 33i forms the space 34, in which the dynamic damper 10 is arranged, together with a bulged part of the front panel 32. Further, the front panel 32 and the rear panel 33 abut on each other around the space 34, thereby forming a region that can be welded. Details of a structure for arranging the dynamic damper 10 are described after explanation of the structure of the dynamic damper 10.

Figure 7:
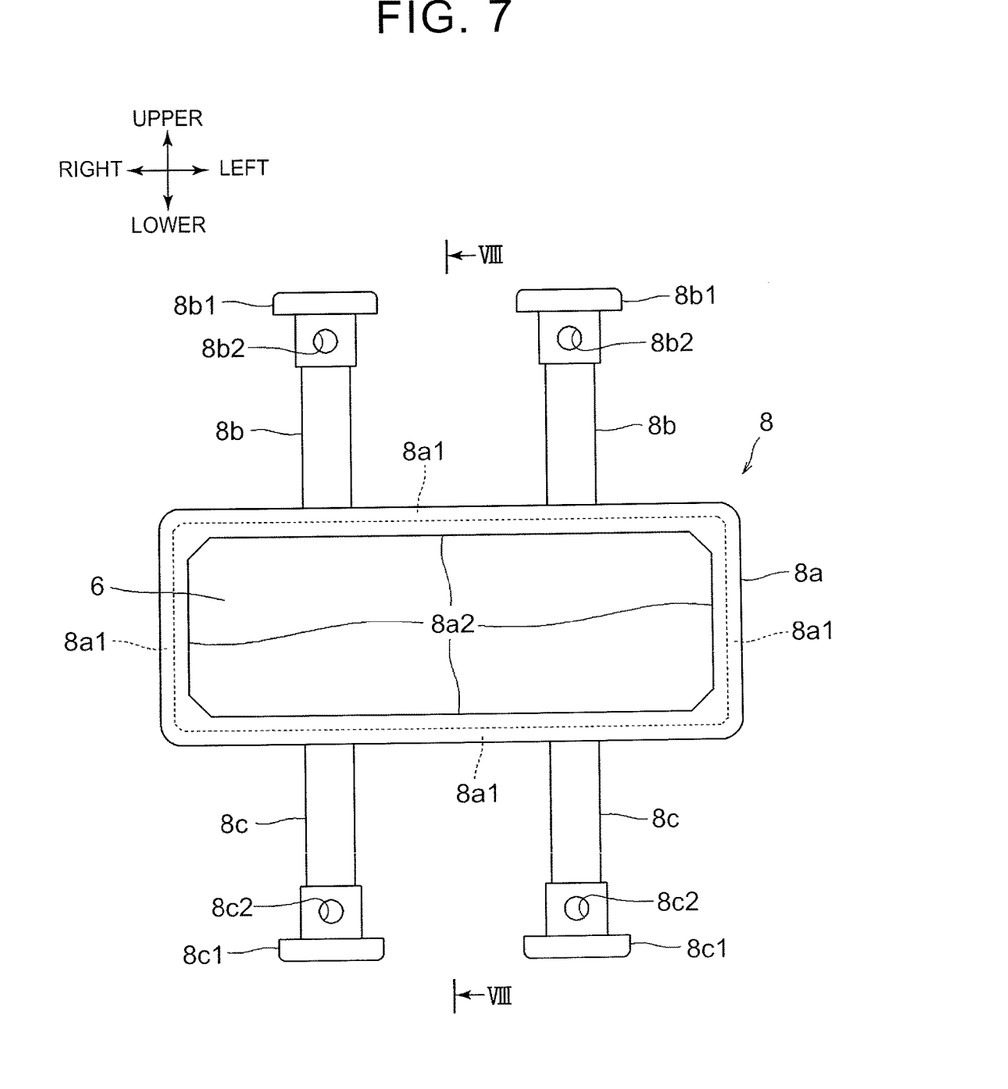
FIG. 7 is a front view of the dynamic damper according to the embodiment.
Figure 8:
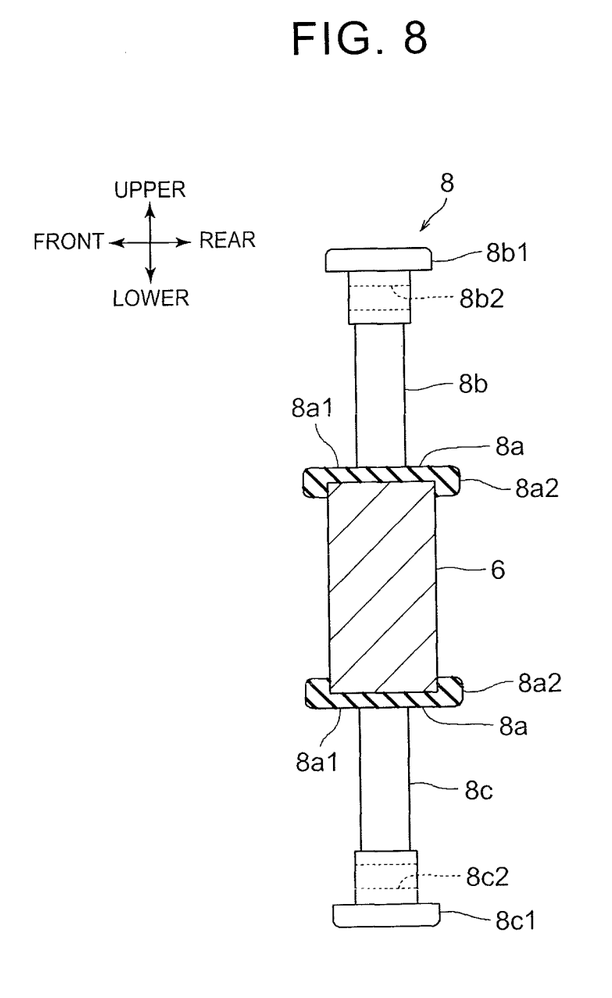
FIG. 8 is a sectional view taken along the arrow line VIII-VIII in FIG. 7.

As shown in FIG. 6 to FIG. 8, the dynamic damper 10 is provided with a weight 6, and an elastic member 8 that elastically supports the weight 6 so as to be able to oscillate with respect to the front panel 32 and the rear panel 33. The elastic member 8 is an example of an "elastic body" in the scope of claims.

The weight 6 is a solid component having a generally rectangular parallelepiped shape made from metal such as a steel material. Although the material for the weight 6 is not limited to metal, use of metal is effective to reduce the size of the dynamic damper 10 because of its large specific gravity. The shape of the weight 6 is not limited to the generally rectangular parallelepiped shape, and may be a wide range of flat-plate shapes such as a disc shape and a polygonal pillar shape.

The elastic member 8 is a member made from styrene-butadiene rubber or ethylene-propylene rubber, and manufactured by vulcanization molding. As shown in FIG. 6 to FIG. 8, the elastic member 8 includes a weight fitting part 8a, which covers all corner parts of the weight 6 and supports the weight 6, a pair of upper pillar parts 8b extending upwardly from the weight fitting part 8a, and a pair of lower pillar parts 8c extending downwardly from the weight fitting part 8a. The weight fitting part 8a is a part that holds the weight 6 by covering all of upper, lower, left, right, front and rear corner parts of the weight 6. As shown in FIG. 4 and FIG. 8, the weight 6 is fitted to the weight fitting part 8a in a state where the weight fitting part 8a covers upper, lower, front, and rear corner parts of the weight 6, and is thus unlikely to come off. Although not illustrated, this also applies to the left, right, front, and rear corner parts of the weight 6. To be more specific, in FIG. 8, the weight fitting part 8a has a main body part 8a1 extending along upper, lower, left, and right surfaces of the weight 6, and an engaging part 8a2 that extends in the front and rear direction from the main body part 8a1 and also extends so as to overhang the weight 6. The weight 6 is fixed to the elastic member 8 by fitting the upper, lower, left, and right outer periphery parts of the weight 6 to recessed parts formed by the main body part 8a1 and the engaging part 8a2 while deforming the weight fitting part 8a. The upper pillar parts 8b have pillar-shaped forms having square transverse sections, and rib parts 8b1 are provided in upper end parts of the pillar parts 8b, respectively, overhanging to the front, rear, left and right. Further, through-holes 8b2 are provided slightly below the rib parts 8b1 of the upper pillar parts 8b, passing through in the front and rear direction. Lower pillar parts 8c have pillar-shaped forms having square transverse sections, and rib parts 8c1 are provided in lower end parts of the lower pillar parts 8c, overhanging to the front, rear, left and right. Further, through-holes 8c2 are provided slightly above the rib parts 8c1 of the lower pillar parts 8c, passing through in the front and rear direction. The material for the elastic member 8 is not limited to rubber, and may be resin such as thermoplastic elastomer. Here, the weight fitting part 8a is an example of a "fitting part" in the scope of claims, and the upper pillar parts 8b and the lower pillar parts 8c are examples of a "a part other than a fitting part" in the scope of claims.

With reference to FIG. 4 and FIG. 6, explanation is given regarding a structure and method for attaching the dynamic damper 10 to the front panel 32 and the rear panel 33. A pair of engagement holes 33j are provided equidistantly from the center line in the left and right direction slightly below the lower wall surface 33d of the upper transverse groove part 33c of the rear panel 33. The interval between the left and right engagement holes 33j is set to be equal to a distance between the through-holes 8b2 provided in the pair of upper pillar parts 8b of the dynamic damper 10. Projecting parts 33k projecting to the front are provided on both left and right sides of each of the engagement holes 33j. The interval between the projecting parts 33k sandwiching the engagement hole 33j is set to be slightly larger than a width of the upper pillar part 8b in the left and right direction. A pair of engagement holes 33m are provided equidistantly from the center line in the left and right direction slightly above the upper wall surface 33g of the lower transverse groove part 33f of the rear panel 33. The interval between the left and right engagement holes 33m is set to be equal to a distance between the through-holes 8c2 provided in the pair of lower pillar parts 8c of the dynamic damper 10. Projecting parts 33n projecting to the front are provided on both left and right sides of each of the engagement holes 33m. The interval between the projecting parts 33n sandwiching the engagement hole 33m is set to be slightly larger than the width of the lower pillar part 8c in the left and right direction. The intervals between the engagement holes 33j and the engagement holes 33m on the left and right are set to be slightly larger than distances between the through-holes 8b2 and the through-holes 8c2 of the dynamic damper 10, respectively. Thus, when the engagement holes 33j and the engagement holes 33m of the rear panel 33 on the left and right sides are mated with the through-holes 8b2 and the through-holes 8c2 of the dynamic damper 10 on the left and right sides, respectively, the upper pillar parts 8b and the lower pillar parts 8c of the dynamic damper 10 are stretched. Engagement holes and projecting parts are also provided in the front panel 32 at positions symmetrical to those of the rear panel 33 with respect to the joining surface when the front panel 32 and the rear panel 33 are joined to each other into the shell shape.

Explanation is given regarding a method for attaching the dynamic damper 10 to the frame 3a. In FIG. 6, the rear panel 33 and the left and right stays 31 are arranged on a clamping jig (not shown) that supports the flange parts 33b, 33e, 33h of the rear panel 33 facing upwards, and supports the left and right stays 31 at appropriate positions with respect to the rear panel 33. From the clamping jig, four columnar positioning pins in total are erected vertically to the surface to be joined to the front panel 32 at positions corresponding to the engagement holes 33j and the engagement holes 33m.

Each of the columnar positioning pins has an outer diameter that is slightly smaller than those of the engagement holes 33j and the engagement holes 33m. Therefore, when the rear panel 33 is placed on the clamping jig, the four positioning pins extend upwardly through the engagement holes 33j and the engagement holes 33m of the rear panel 33. In this state, the dynamic damper 10, is placed and set so that the four positioning pins pass though the through-holes 8b2 and the through-holes 8c2 of the dynamic damper 10. In short, the two positioning pins passing through the engagement holes 33j are passed through the two through-holes 8b2 of the dynamic damper 10, and the two positioning pins passing through the engagement holes 33m are passed through the two through-holes 8c2 of the dynamic damper 10. At this time, since distances between the through-holes 8b2 and the through-holes 8c2 of the dynamic damper 10 are shorter than distances between the engagement holes 33j and the engagement holes 33m of the rear panel 33, tension is applied to the upper pillar parts 8b and the lower pillar parts 8c of the elastic member 8. In this state, the rib parts 8b1 of the upper pillar parts 8b are engaged with the lower wall surface 33d of the upper transverse groove part 33c of the rear panel 33, and the rib parts 8c1 of the lower pillar parts 8c are engaged with the upper wall surface 33g of the lower transverse groove part 33f of the rear panel 33. By covering this with the front panel 32, the four positioning pins pass through the four engagement holes of the front panel 32, and the rib parts 8b1 of the upper pillar parts 8b are engaged with the lower wall surface of the upper transverse groove part of the front panel 32, and the rib parts 8c1 of the lower pillar parts 8c are engaged with the upper wall surface of the lower transverse groove part of the front panel 32. In this state, contact parts of the outer peripheral flange parts of the front panel 32 and the rear panel 33, inner parts of the vertical groove parts 33a and the upper transverse groove part 33c, and the left and right stays 31 are fixed to each other by welding, and the clamping jig is removed. At this time, the rib parts 8b1 of the upper pillar parts 8b and the rib parts 8c1 of the lower pillar parts 8c of the dynamic damper 10 are engaged with the lower wall surfaces of the upper transverse groove parts and the upper wall surfaces of the lower transverse groove parts of the front panel 32 and the rear panel 33, respectively. Therefore, even when the positioning pins are removed, tension remains applied to the upper pillar parts 8b and the lower pillar parts 8c. Further, the upper pillar parts 8b are supported by being sandwiched between the projecting parts 33k so as not to be able to move in the left and right direction, and the lower pillar parts 8c are supported by being sandwiched between the projecting parts 33n so as not to be able to move in the left and right direction. Thus, the dynamic damper 10 is supported so as not to be able to move with respect to the frame 3*a* in any of the upper and lower, and left and right directions.

A method for manufacturing the headrest 3 is explained. The frame 3*a*, to which the foregoing dynamic damper 10 is attached, is covered with the skin 3*c* formed into a bag shape, and then set in a mold for urethane foam molding having a cavity corresponding to an external shape of the headrest 3. A foamed urethane material is injected into the skin 3*c*, and removed from the mold after foam molding is completed, thereby obtaining the headrest 3. The dynamic damper 10 is arranged inside the space 34 formed by the front panel 32 and the rear panel 33, and outer periphery parts of the front panel 32 and the rear panel 33 are sealed by welding. Therefore, during the foam molding of the foamed urethane material, the foamed urethane material is restrained from entering the space 34. Hence, a sufficient space 34 is ensured for the dynamic damper 10 to vibrate.

The embodiment structured as above provides the following action effects. The weight fitting part 8*a* is provided in the elastic member 8 of the dynamic damper 10, and the weight 6 is attached to the weight fitting part 8*a* as the weight 6 is fitted into the weight fitting part 8*a* so that all of the upper, lower, left, right, front and rear corner parts of the weight 6 are covered by the weight fitting part 8*a*. Thus, it becomes possible to manufacture the dynamic damper 10 highly productively with a small number of components and materials and without using materials and components such as an adhesive and a screw. This means that it is possible to manufacture a vehicle seat, in which the dynamic damper is arranged inside the inner space of the vehicle seat, highly productively with a small number of components and materials. Further, the engaging part 8*a*2 is provided in the weight fitting part 8*a* of the elastic member 8, and the engaging part 8*a*2 covers all of upper, lower, left, right, front and rear corner parts of the weight 6 and extends towards the front panel 32 and the rear panel 33. Thus, without attaching an interference preventing material and the like on inner sides of the front panel 32 and the rear panel 33, it is possible to restrain generation of abnormal noise and so on due to direct contact between the weight 6, and the front panel 32 and the rear panel 33. In short, the weight fitting part 8*a* of the elastic member 8 is able to have both functions of holding the weight 6 and preventing generation of abnormal noise and so on, thereby reducing the number of components. Further, by attaching the front panel 32 and the rear panel 33 so as to sandwich the left and right stays 31 from the front and the rear, it is possible to form the space 34 and arrange the dynamic damper 10 inside the headrest 3. Thus, it is possible to arrange the dynamic damper 10 inside the headrest 3 highly productively. Further, the dynamic damper 10 is arranged inside the headrest 3 that is the farthest from the floor, a source of vibration. Therefore, the dynamic damper 10 is able to vibrate greatly, thereby attenuating vibration of the seat for an automobile 1 effectively.

Figure 9:
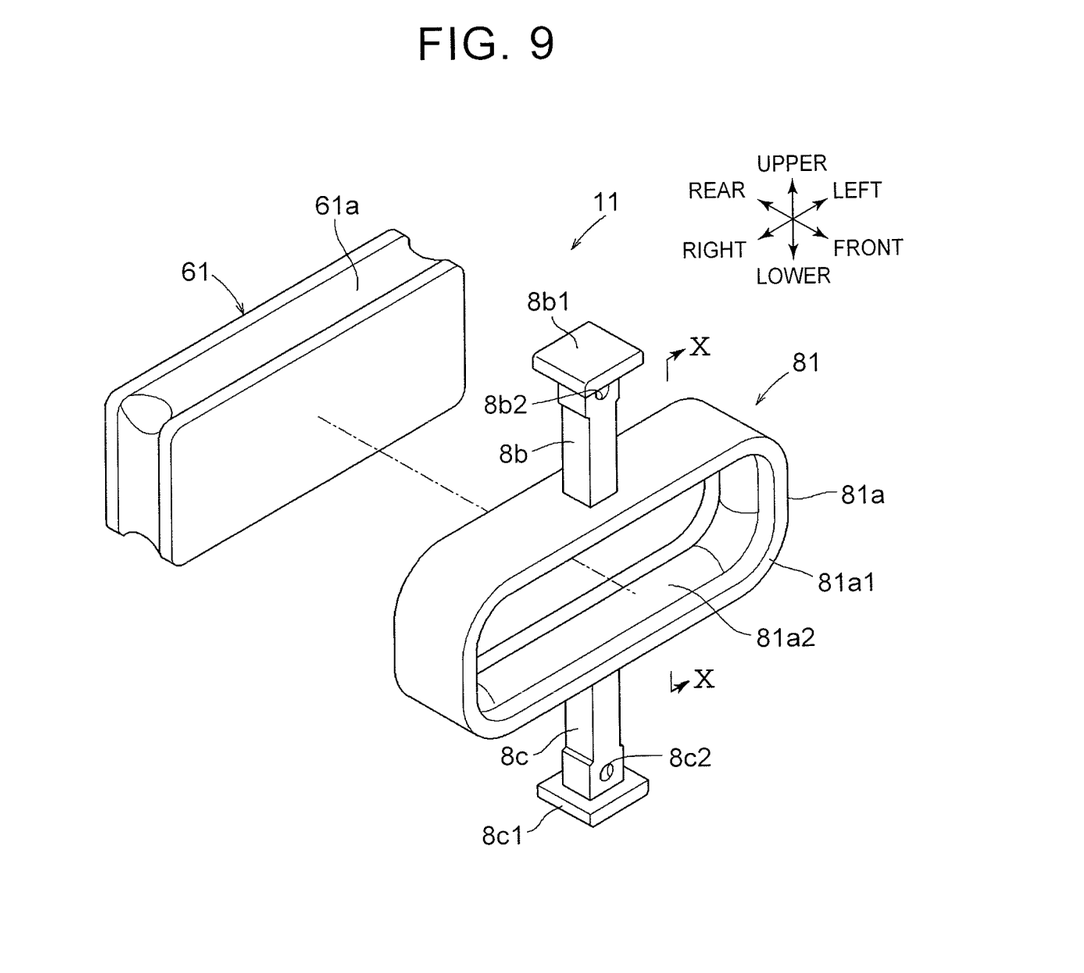
FIG. 9 is an exploded perspective view of a dynamic damper according to another embodiment of the invention.
Figure 10:
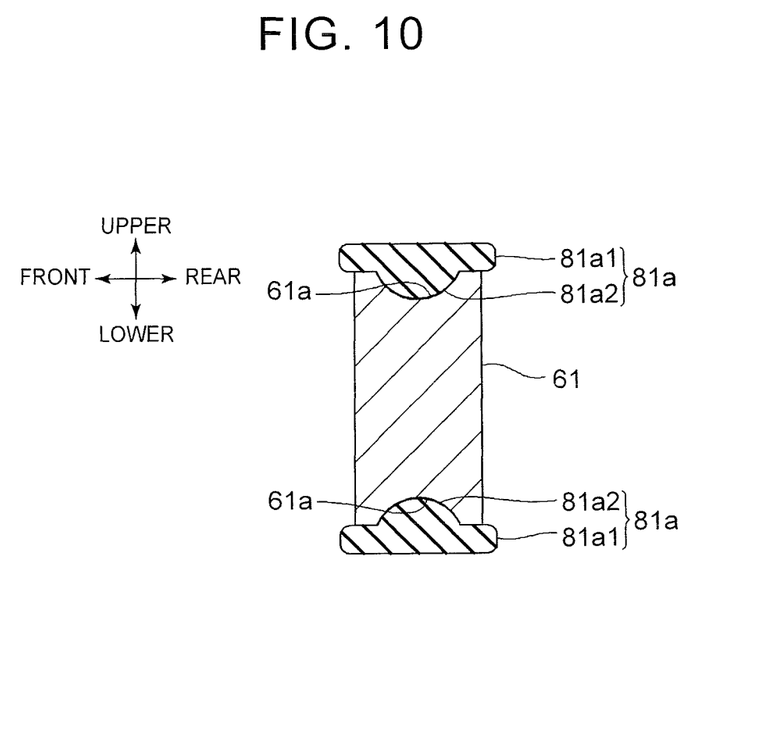
FIG. 10 is a sectional view taken alone the arrow line X-X in FIG. 9.

FIG. 9 and FIG. 10 show a weight 61 and an elastic member 81 of a dynamic damper 11 according to another embodiment of the invention. With regard to the structures duplicated with those of the foregoing embodiment, the same reference numerals are used in the drawings and explanation is omitted. A difference from the foregoing embodiment is that the shapes of the weight and the elastic member of the dynamic damper are different. The weight 61 has a form in which a groove 61*a* having a generally U-shaped section is formed in the weight 6 according to the foregoing embodiment, the groove 61*a* being continuous across four upper, lower, left and right surfaces of the weight 6. An elastic member 81 has a weight fitting part 81*a*, which supports the weight 61 by covering all corner parts of the weight 61, one upper pillar part 8*b* extending upwardly from the weight fitting part 81*a*, and one lower pillar part 8*c* extending downwardly from the weight fitting part 81*a*. The weight fitting part 81*a* is a part that holds the weight 61 by covering all of the upper, lower, left, right, front and rear corner parts of the weight 61. As shown in FIG. 10, the weight 61 is fitted to the weight fitting part 81*a* in a state where the upper, lower, front, and rear corner parts of the weight 61 are covered by the weight fitting part 81*a*, and is thus unlikely to come off. Although not illustrated, this also applies to the left, right, front and rear corner parts of the weight 61.

To explain in more detail, in FIG. 10, the weight fitting part 81*a* has a main body part 81*a*1 extending along upper, lower, left, and right surfaces of the weight 61, and a projecting part 81*a*2 that has a generally U-shaped section and projects to the inner side from the center part of the inner side of the main body part 81*a*1. The main body part 81*a*1 is formed so that the length in the front and rear direction is larger than the length of the weight 61 in the front and rear direction. Thus, the main body part 81*a*1 projects from a front surface and a rear surface of the weight 61 when the weight 61 is attached to the weight fitting part 81*a*. The projecting part 81*a*2 is formed into a shape so as to be able to be in close contact with and fitted to the groove 61*a* of the weight 61. The weight 61 is fixed as the main body part 81*a*1 is arranged around upper, lower, left and right outer periphery surfaces of the weight 61 while deforming the weight fitting part 81*a* and fitting the projecting part 81*a*2 into the groove 61*a*. The forms of the upper pillar part 8*b* and the lower pillar part 8*c* are the same as those of the elastic member 8 according to the foregoing embodiment, and how to attach the upper pillar part 8*b* and the lower pillar part 8*c* to a front panel 32 and a rear panel 33 is also the same. Only the number of upper pillar part 8*b* and the lower pillar part 8*c* is different. However, similarly to the elastic member 8 of the foregoing embodiment, two upper pillar parts 8*b* and two lower pillar parts 8*c* may also be provided. Here, the weight fitting part 81*a* is an example of the "fitting part" in the scope of claims, and the upper pillar part 8*b* and the lower pillar part 8*c* are examples of the "part other than a fitting part" in the scope of claims. The dynamic damper 11 according to another embodiment also provides similar action effects to those of the dynamic damper 10 according to the foregoing embodiment. However, front and rear protruding parts of the weight fitting part 81*a* serve as parts that prevent interference of the weight 61 onto the front panel 32 and the rear panel 33.

Figure 11:
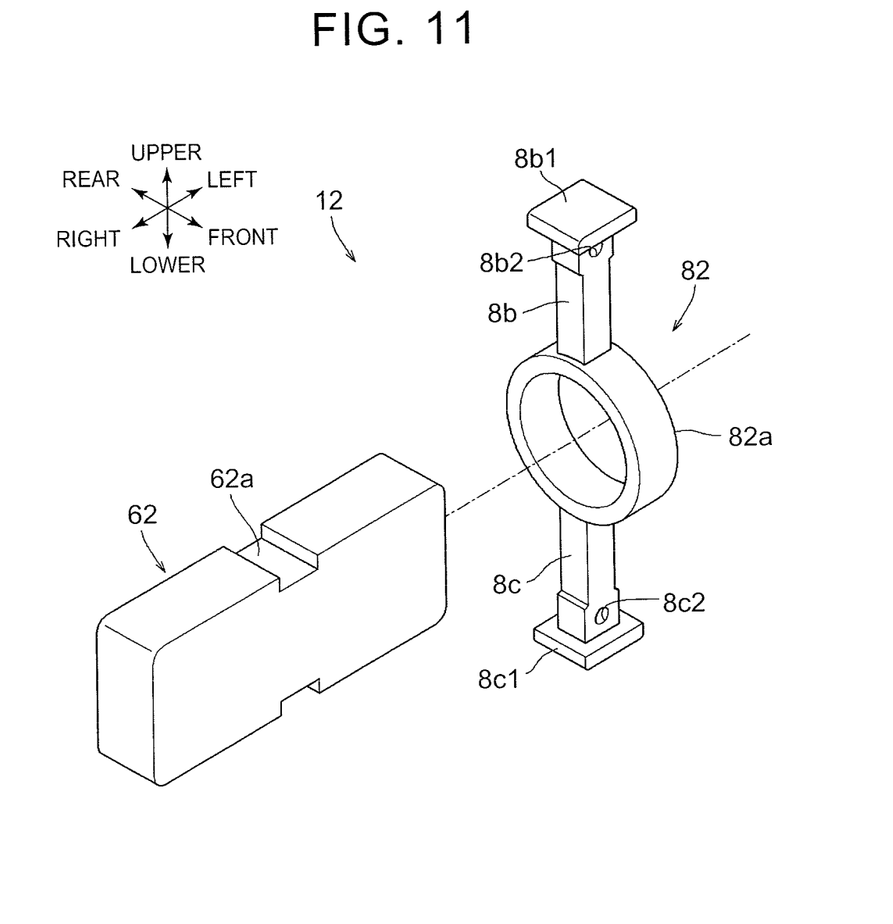
FIG. 11 is an exploded perspective view of a dynamic damper according to yet another embodiment of the invention.

FIG. 11 shows a weight 62 and an elastic member 82 of a dynamic damper 12 according to yet another embodiment of the invention. With regard to the structures duplicated with those of the foregoing embodiment, the same reference numerals are used in the drawings and explanation is omitted. A difference from the foregoing embodiment is that the shapes of the weight and the elastic member of the dynamic damper are different. The weight 62 has a form in which grooves 62*a* are formed in an upper surface and a lower surface of the center part in the left and right direction of the weight 6 according to the foregoing embodiment. The grooves 62*a* have generally U-shaped sections and extend in the front and rear direction. The elastic member 82 has a weight fitting part 82*a*, which is fitted into the grooves 62*a* of the weight 62 and supports the weight 62, one upper pillar part 8*b* extending upwardly from the weight fitting part 82*a*, and one lower pillar part 8*c* extending downwardly from the weight fitting part 82*a*. The weight fitting part 82*a* is formed into a cylindrical shape having a length slightly smaller than widths of the grooves 62a and an axis extending in the left and right direction so that the weight fitting part 82a is fitted into the grooves 62a of the weight 62.

To be more specific, in FIG. 11, the weight fitting part 82a is formed into a cylindrical shape having a circumference that allows the weight fitting part 82a to be attached to the weight 62 in a stretched manner when the ring is stretched and fitted into the grooves 62a of the weight 62. Forms of an upper pillar part 8b and a lower pillar part 8c are the same as those of the elastic member 8 according to the foregoing embodiment, and the upper pillar part 8b and the lower pillar part 8c are attached to a front panel 32 and a rear panel 33 in a similar manner. Here, the weight fitting part 82a is an example of the "fitting part" in the scope of claims, and the upper pillar part 8b and the lower pillar part 8c are examples of the "part other than a fitting part" in the scope of claims. The dynamic damper 12 according to this another embodiment provides similar action effects to those of the dynamic damper 10 according to the foregoing embodiment except the function of preventing the weight 62 from being in direct contact with the inner sides of the front panel 32 and the rear panel 33.

Although the specific embodiments have been explained so far, the invention is not limited to the external appearance and structures of those embodiments, and various changes, additions, deletions may be made without departing from the gist of the invention, for example, as follows.

In the above-mentioned embodiments, the front panel 32, the rear panel 33 and the dynamic damper 10, 11, 12 are arranged, but not limited to, inside the headrest 3, and may also be arranged inside the seat back 2 or the seat cushion 4.

In the foregoing embodiment, the weight fitting part 8a, 81a, 82a of the elastic member 8, 81, 82, the upper pillar parts 8b and the lower pillar parts 8c are made integrally with each other from the same material. However, the invention is not limited to this, and the weight fitting part 8a, 81a, 82a, the upper pillar parts 8b, and the lower pillar parts 8c may be made from materials having different moduluses of elasticity and formed as an integral part, or may be combined with each other as separate members.

In the foregoing embodiments, a rubber material such as styrene-butadiene rubber and ethylene-propylene rubber is applied as a material for the elastic member 8, 81, 82. However, the invention is not limited to this, and thermoplastic resin having an adhesive property, such as modified polypropylene resin may be used. Generally, a formed product of modified polypropylene resin has higher modulus of elasticity than that of a formed product of a rubber material. Therefore, in order to facilitate bending deformation, sectional shapes of the upper pillar parts 8b and the lower pillar parts 8c may be elaborated to provide weakened parts or the like, so that deformation happens easily.

In the foregoing embodiments, one or two upper pillar parts 8b and one or two lower pillar parts 8c of the elastic member 8, 81, 82 are arranged respectively in parallel to each other in the upper and lower direction. However, the invention is not limited to this, the number of pillar parts may be three or more, and the pillar parts may be arranged in the left and right direction. Moreover, the pillar parts are not necessarily arranged in parallel to each other, and the numbers of pillar parts may be different between upper and lower sides, or between left and right sides.

In the foregoing embodiments, the front panel 32 and the rear panel 33 are press-formed metallic products that are joined to each other by welding. The invention is not limited to this, and the front panel 32 and the rear panel 33 may be press-formed resin products. Also, the front panel 32 and the rear panel 33 may be joined to each other not only by welding but also by a mechanical joining method such as fitting and screw fastening, as well as thermal fusion bonding and adhesion.

In the foregoing embodiments, the dynamic damper 10, 11, 12 is attached to the front panel 32 and the rear panel 33 by sandwiching parts of the upper pillar parts 8b and the lower pillar parts 8c between the front panel 32 and the rear panel 33. The invention is not limited to this, and part of the upper pillar parts 8b and the lower pillar parts 8c may be attached to the front panel 32 or the rear panel 33 by a mechanical joining method such as fitting and screw fastening, or may be joined by thermal fusion bonding, adhesion and so on.

In the foregoing embodiment, the invention is applied, but not limited to, a seat for an automobile, and may also be applied to seats for a railway vehicle, an airplane, a ship, and so on.

What is claimed is:

1. A vehicle seat comprising:
   a skeleton member;
   panel members that are attached to the skeleton member and has a space inside; and
   a dynamic damper that is provided with a weight and an elastic body and arranged inside the space, wherein:
   the weight is fixed by being fitted into a fitting part, the fitting part being provided in the elastic body and formed so as to encircle and be able to be fitted to a portion of an outer periphery part of the weight; and
   a part of the elastic body other than the fitting part is fixed to the panel members.

2. The vehicle seat according to claim 1, wherein:
   the weight is formed into a plate-shaped form; and
   the fitting part is formed so as to cover a part or all of corner portions in the outer periphery part of the weight so that the weight does not come into direct contact with the panel members when the dynamic damper vibrates greatly.

3. The vehicle seat according to claim 1, wherein the fitting part and the part of the elastic body other than the fitting part are formed integrally with each other.

* * * * *